United States Patent
Chandorkar et al.

(10) Patent No.: US 10,796,359 B2
(45) Date of Patent: Oct. 6, 2020

(54) CONSUMER SAMPLING WEBPAGE LINKED WITH DIGITAL WALLET

(71) Applicant: MASTERCARD INTERNATIONAL INCORPORATED, Purchase, NY (US)

(72) Inventors: Priyanka Chandorkar, Maharashtra (IN); Priyanka Pandey, Maharashtra (IN); Ankita Agarwal Matkar, Maharashtra (IN); Ankit Walia, Maharashtra (IN); Vijay Kumar Goyal, Maharashtra (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 274 days.

(21) Appl. No.: 15/786,667

(22) Filed: Oct. 18, 2017

(65) Prior Publication Data
US 2019/0114695 A1   Apr. 18, 2019

(51) Int. Cl.
*G06Q 30/00* (2012.01)
*G06Q 30/06* (2012.01)
*G06Q 20/36* (2012.01)
*G06Q 20/32* (2012.01)
*G06Q 20/20* (2012.01)

(52) U.S. Cl.
CPC ....... *G06Q 30/0641* (2013.01); *G06Q 20/204* (2013.01); *G06Q 20/322* (2013.01); *G06Q 20/36* (2013.01); *G06Q 20/367* (2013.01); *G06Q 30/0643* (2013.01)

(58) Field of Classification Search
CPC ........................................ G06Q 30/0601–0645
USPC ................................................ 705/26.1–27.2
See application file for complete search history.

(56) References Cited

U.S. PATENT DOCUMENTS

| | | | | |
|---|---|---|---|---|
| 2003/0018778 | A1* | 1/2003 | Martin | H04L 67/306 709/224 |
| 2013/0110666 | A1* | 5/2013 | Aubrey | G06K 9/00369 705/26.5 |
| 2013/0218721 | A1* | 8/2013 | Borhan | G06Q 30/02 705/26.41 |
| 2014/0279289 | A1* | 9/2014 | Steermann | G06T 11/60 705/27.2 |
| 2016/0042564 | A1* | 2/2016 | Osada | G06O 30/0643 345/632 |

OTHER PUBLICATIONS

Jennifer, L. S. (2016). 5 digital retail trends that will be big in 2017. CIO, , n/a. Retrieved from https://dialog.proquest.com/professional/docview/1851043547?accountid=131444.*

* cited by examiner

*Primary Examiner* — Resha Desai
(74) *Attorney, Agent, or Firm* — Budzyn IP Law, LLC

(57) ABSTRACT

A system and method for enabling a consumer to virtually sample and purchase a product while shopping on-line are provided. In accordance with embodiments of the present invention, a system and method provide an improved and streamlined holistic on-line shopping experience which includes providing a sampling webpage linked to a consumer's digital wallet to allow for sampling for a product and purchase thereof.

14 Claims, 3 Drawing Sheets

CONSUMER SAMPLING WEBPAGE LINKED WITH DIGITAL WALLET

FIELD OF THE INVENTION

The present invention relates to an improved system and method for virtually sampling a product and for purchasing the product using a digital wallet.

BACKGROUND OF THE INVENTION

There are many conveniences to on-line shopping. The ability to shop anytime, anywhere for virtually any product using any type of computing device is a significant part of what is driving the e-commerce explosion. Consumers now have at their fingertips access to every conceivable type of goods and services. In an age of instant gratification, on-line shopping thrives.

Consumers, however, can be demanding—ever expecting more from the on-line shopping experience. The competition created by the proliferation of e-commerce websites, tools, etc. is leading to an ever-improving on-line shopping experience. It is also leading to consumers demanding more and more from the e-commerce experience. It is no longer enough to provide e-commerce consumers with static access to goods and services, and a shopping experience that mimics brick-and-mortar shopping (e.g., browse merchandise, place items in your cart, check out by providing personal information for payment and sipping, etc.). Consumers expect e-commerce merchants to constantly provide more. In addition, e-commerce merchants are driven by competition to constantly provide more to distinguish themselves from their competitors.

E-commerce merchants have improved the on-line shopping experience by providing consumers the option to check-out using a digital wallet. A consumer no longer needs to enter sensitive information like credit card number, bank information, birthday, etc., to complete an on-line shopping transaction, as this information is securely maintained in the consumer's digital wallet. At check-out, the consumer selects the digital wallet to complete the transaction, provides login credentials, and both the consumer and merchant benefit from a more streamlined, easier to use, and secure check-out process.

One of the shortcomings of on-line shopping is the inability of the consumer to "touch and feel" the product. When shopping in a store a consumer can try on clothes or jewelry, sit in a chair, size-up a television, and otherwise "sample" a product before buying it. This part of the shopping process is currently lacking for on-line shopping. Merchants are beginning to explore and implement augmented reality—a technology that layers virtual objects or holograms onto the consumer's environment. Some applications of augmented reality require that the consumer have special hardware like a virtual reality headset. This also requires special software to enable the headset and couple it with the on-line shopping experience. In addition to being expensive, this solution is cumbersome and generally out of reach for most consumers.

Even with the advancements made by merchants to the e-commerce experience, a holistic and complete end-to-end on-line shopping experience that overcomes current deficiencies is still lacking.

SUMMARY OF THE INVENTION

The present invention is directed to a system and method for enabling a consumer to virtually sample and purchase a product while shopping on-line. In accordance with embodiments of the present invention, a system and method provide an improved and streamlined holistic on-line shopping experience. By providing a digital wallet with the ability of the consumer to sample a product live, and in real-time, before buying the product, and to then buy the product using a digital wallet, the present invention enhances and streamlines a consumer's shopping experience. The present invention enables consumers to try products before buying them, as if the consumer is in possession of the product, thereby increasing consumer confidence in purchasing decisions, and decreasing the occurrence of returns due to dissatisfaction. The present invention benefits merchants similarly because consumers are less likely to return a product that they have seen and tried prior to purchasing. In addition, merchants are able to utilize the present invention without significant modification of on-line shopping portals and without substantial investment in computer resources and systems. Merchants may incorporate the subject invention by simply adding a clickable button or other engageable graphical user interface element on their website, without the need for other modifications. The engagement by the consumer provides the consumer with access to a digital wallet with sampling, thus, allowing for a "try and buy" consumer experience.

These and other features of the invention will be better understood through a study of the following detailed description and accompanying drawings.

DETAILED DESCRIPTION OF THE INVENTION

Figure 1:
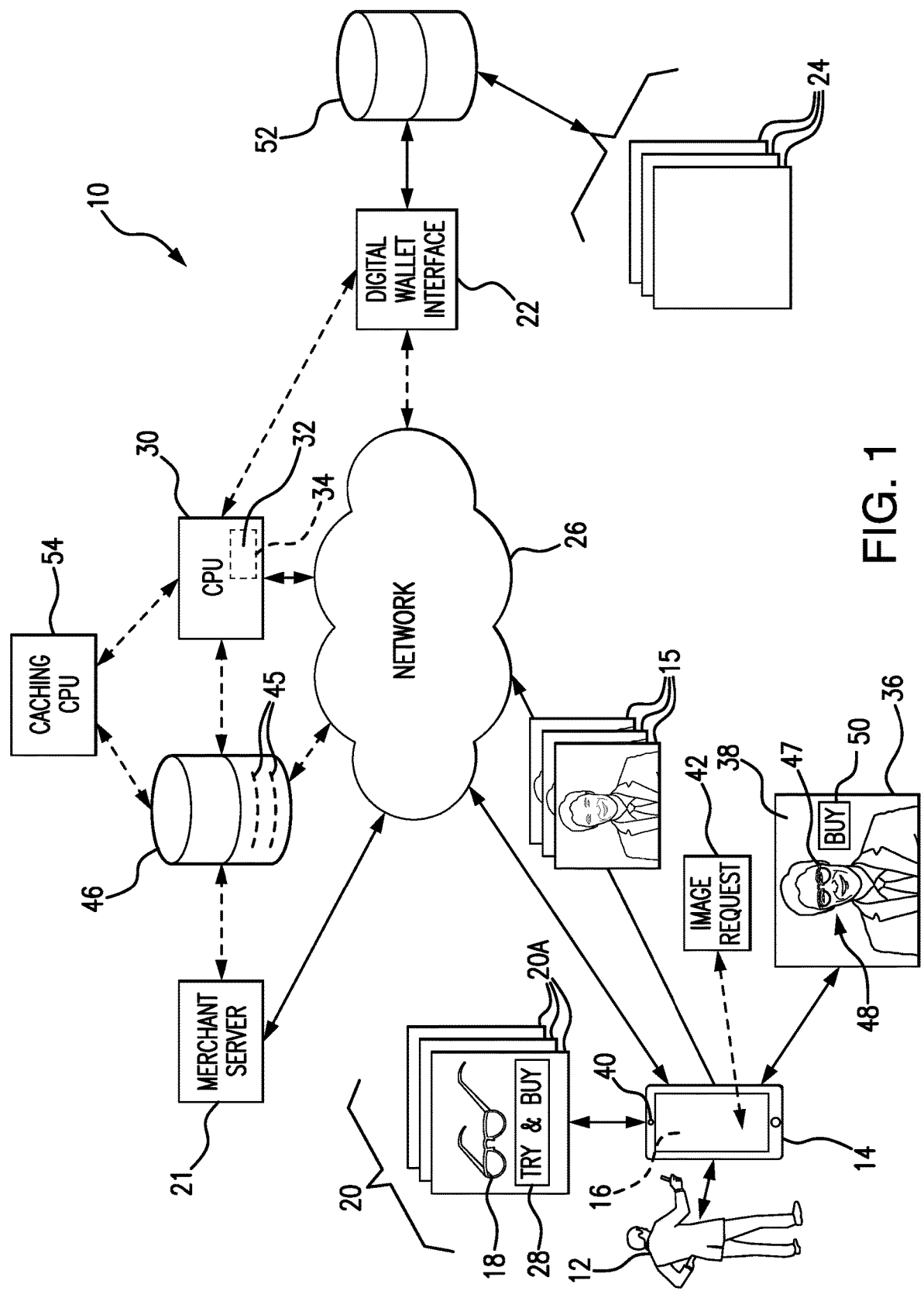
FIG. 1 depicts a system for virtually sampling a product and for purchasing the product using a digital wallet, including certain devices and components configured in accordance with the present invention.

As used herein, the term "connectable" refers to various states of connection between electronic devices. For example, "connectable" refers to a physical connection between electronic devices, a wireless connection between electronic devices, a combination of a physical and wireless connection between electronic devices, a transient or episodic connection between electronic devices. As used herein the term "connectable" also refers to various states of connectivity between electronic devices such as, by way of non-limiting example, when electronic devices are not connected, when electronic devices are connecting, and when electronic devices are connected.

The present invention is directed to an improved system and method that enables a consumer to virtually sample a product before buying it, and then proceed to buy the product using a digital wallet, e.g., an express checkout feature. The present invention simplifies the on-line shopping experience for the consumer, while at the same time offering an improved and enhanced e-commerce experience that benefits the consumer and the merchant. In accordance with embodiments of the present invention, a consumer is now able to virtually try on an item before buying it, in much the same way a consumer can do so when shopping at a merchant's brick-and-mortar location. The present invention enables this enhanced and improved e-commerce experience without requiring special and expensive computing devices (e.g., virtual reality headsets), and without requiring the merchant to invest in expensive computer hardware or software, or host and run processor and bandwidth intensive applications.

The merchant benefits from the present invention by being able to offer consumers an improved and differentiable e-commerce experience. With simple changes to a merchant's e-commerce user interface, a merchant can offer the present invention to consumers. The merchant merely needs to add an option on its e-commerce user interface to utilize the present invention. All other aspects of the present invention are implemented by one or more servers and do not require additional computer hardware or software at the merchant.

The consumer benefits from the present invention by being able to sample or try on an item before deciding whether to buy it. While there was a time when this was the norm, the explosion of e-commerce and on-line shopping has created a new paradigm in which consumers have come to accept buying merchandise without first trying it on or seeing it in person. As could be expected, returns from unsatisfied consumers are significant. With the present invention, the consumer benefits by being able to see what an item looks like in the environment in which it will be used, e.g., clothes and jewelry on the consumer, TV on a dresser, etc. Like the merchant, expensive and special purpose computer hardware and software are not required for the consumer's use of the present invention. The consumer accesses a merchant's website just as he/she would today to shop on-line at the merchant. While shopping, items of the merchant that utilize the present invention will provide the consumer with access to a digital wallet selectable by the consumer, with the digital wallet having a sampling and a purchasing (i.e., try and buy) option.

With reference to FIG. 1, a system 10 is provided by which a consumer 12, via an electronic device 14 with a web-enabled browser 16, has the ability to virtually sample an item 18 selected on a merchant's website 20. The virtual sampling includes superimposition on a framed webpage of a rendering of the item 18 on an image designated by the consumer 12; the image may be of the consumer 12 or of another person selected by the consumer 12. The system 10 also includes an interface 22 configured to interface with a plurality of electronic digital wallets 24 to make accessible at least one of the digital wallets 24 to the consumer 12 to allow for purchase of the item 18. The system 10 utilizes a network 26, which is preferably, a global network of computers, such as the Internet.

The electronic device 14 may be any device capable of interacting with the browser 16 to interact with the network 26, e.g., via a network-connectable site, website, portal, and the like. The electronic device 14, without limitation, may be a smartphone, web-enabled device, computer, laptop, pad, notebook, and so forth, configured to interact with the network 26. The browser 16 may be of any configuration capable of launching, displaying and allowing interfacing with websites, webpages, windows, frames, and the like, communicated across the network 26 and accessed by the electronic device 14. The electronic device 14 and/or the browser 16 provide the consumer 12 with various features to interact with the content displayed by the browser 16, such as a touchscreen, touchpad, mouse, trackpad, graphical elements, etc.

The merchant's website 20 may be generated using any known programming, including, but not limited to, HTML, Java, and so forth. The merchant's website 20 may be locatable on the network 26 with an assigned URL. The merchant's web site 20 may contain one or more webpages 20A, arranged in any known manner. The webpages 20A may contain details of one or more items 18 being offered for sale on the merchant's website. The content on the webpages 20A may vary, and may include, written description, one or more photographs, interactive features (such as image enlargement, pull-down menus, etc.), and so forth. The merchant website 20 may be hosted on any computing device with the network 26, designated herein as merchant's server 21. The merchant's server 21 may be operated and maintained internally and/or by a third-party. Furthermore, the merchant's server 21 may be a distributed set of computing units linked directly or through the network 26.

A consumer engageable feature 28 may be provided on one or more of the webpages 20A to allow the consumer 12 to request sampling of a selected item 18. The consumer engageable feature 28 may be any graphical user interface feature, such as a clickable button, clickable menu item, etc. With the consumer 12 engaging the feature 28, a call, e.g., an API call, is generated which is transmitted across the network 26 to a computing processing unit (CPU) 30 to request execution of a sampling program of instructions 32 stored in electronic (non-transitory) memory 34. The execution of the sampling program of instructions 32 results in several actions:

a frame 36 to be generated on the electronic device 14 by the browser 16, separate from the merchant's website 20, the frame 36 containing a sampling webpage 38;

prompting, e.g., by transmission, of a request to the electronic device 14 for an image of a person or part of a person intended for use in virtually sampling the item 18;

the image, upon receipt from the electronic device 14, to be processed to create data structures corresponding to physical features of the person or part of the person;

an image of the item 18 to be superimposed on the image of the person of part of the person utilizing the physical features data structures as reference points to create a composite image 48; and, the composite image 48 to be displayed on the sampling webpage 38.

The frame 36 may be generated using standard browser functionality, e.g., with creation of a new window, tab, or page. The sampling program of instructions 32 provides a location, e.g., URL, to the sampling webpage 38, which may be hosted by the CPU 30 or by another server or computer linked with the network 26. The browser 16 utilizes the provided location (e.g., URL) to access and bring up the sampling webpage 38 in the frame 36. Significantly, with the use of the frame 36, the consumer 12 may access the sampling webpage 38 without any modification or other requirement of the merchant web site 20.

The sampling program of instructions 32 prompts, e.g., by transmission, a request to the electronic device 14 for an image 15 of a person or part of a person intended for use in virtually sampling the item 18. If the consumer intends the virtual sampling for him/herself, an image of the consumer 12 may be captured using a camera 40 on the electronic device 14. The captured image may be a digital photograph or digital streaming video. In addition, a stored image or digital video may be utilized, e.g., a stored image of the consumer 12. Alternatively, the consumer 12 may desire to sample the item 18 on another individual, e.g., for giftbuying purposes. Here, the consumer 12 may utilize a stored image of the person intended for sampling or an image may be captured of that person (still image or digital video). The prompt may cause an interstitial page, pop-up window, dialog box, or other displayable arrangement 42 to be generated on the electronic device 14, e.g., by the browser 16, requesting the image 15. The displayable arrangement 42 may provide the consumer 12 with options, such as image capture and image upload.

The image 15 to be provided may be of the person or of a part of the person. Also, the image 15 to be provided must correspond to the item 18 intended for sampling. For example, if the item 18 is intended for the head or face, e.g., eyeglasses, an image of at least the head and face is required. In contrast, if the item 18 is a shirt, an image containing at least a person's torso is required.

The image 15 may be provided in any file format (vector format, rasterized, compound, etc.), such as, JPEG, Exif, Tiff, Gif, BMP, PNG, PPM, PGM, PBM, PNM, WebP, HDR, BAT, BPG, CGM, Gerba, and SVG. The displayable arrangement 42 may provide image file parameters, such as file format and size (e.g., pixel size). The image 15 may be provided in any digital video format, such as MPEG, WebM, flash video, and RealMedia.

The sequence of the prompting of the image request and the generation of the frame 32 is not critical to the invention with these processes being possibly conducted in any order, in partial steps (in any order), and/or simultaneous processing.

Figure 2A:
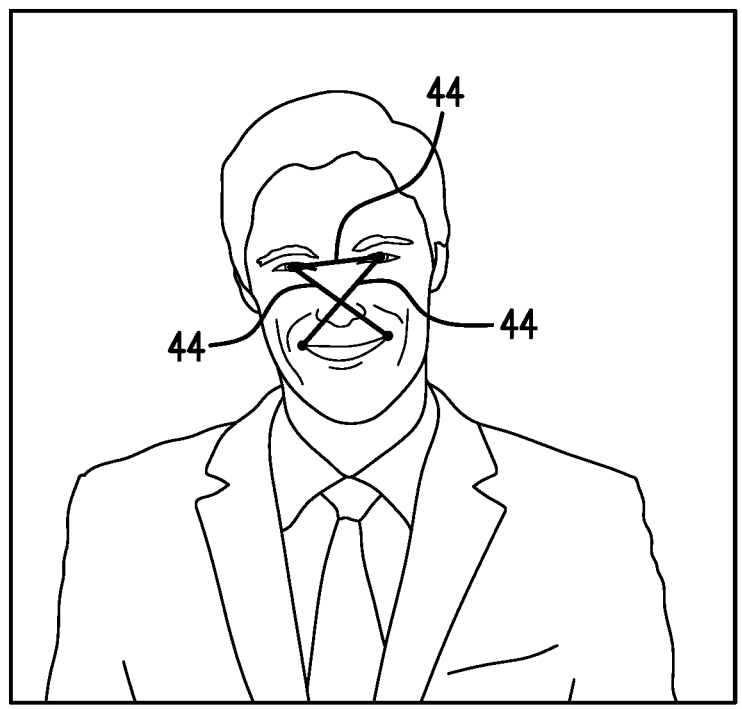
FIGS. 2A and 2B are schematics showing representative physical features which may be utilized in generating physical features data structures in accordance with the present invention; and, FIG. 3 is a flowchart setting forth a process in accordance with the present invention.
Figure 2B:
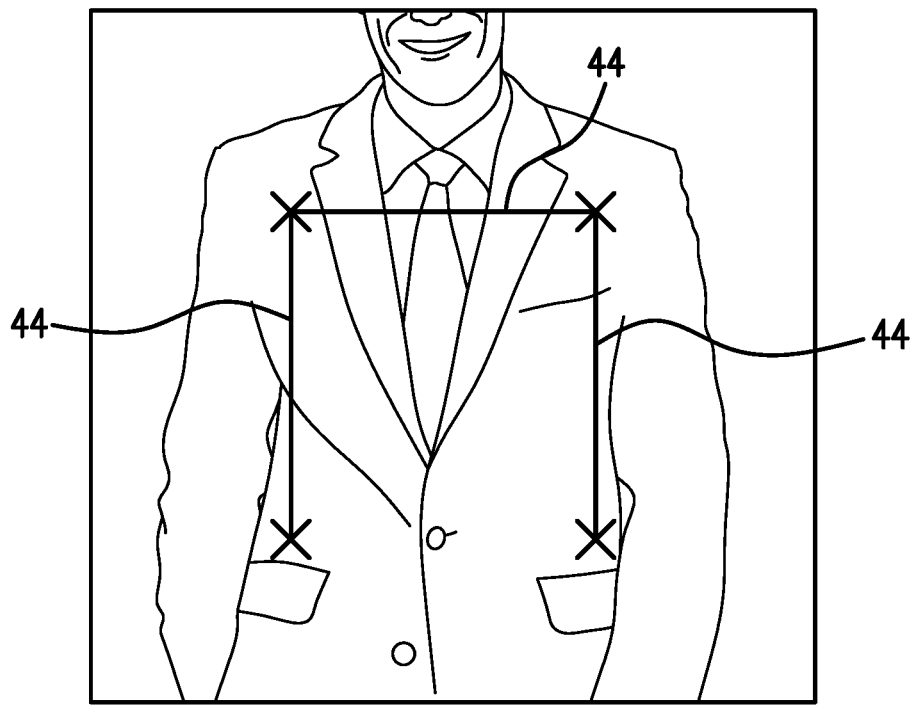

The image 15 is uploaded by transmitting from the electronic device 14, across the network 26, to the CPU 30 or another computer or server on the network 26 linked to the CPU 30. With reference to FIGS. 2A and 2B, the uploaded image 15 is processed, e.g., by the CPU 30, to create data structures 44 which correspond to the physical features of the person or the part of the person in the image 15. With the image 15 being a streaming video or recorded digital video, at least one frame may be selected and parsed from the video for processing.

Any technique for generating the physical features data structures 44 may be utilized. Preferably, the physical features data structures 44 provide reference points of the person or the part of the person in the image 15 which are useable in creating the composite image 48. In particular, the reference points may be used to define locations, size, configuration, etc. of physical attributes within the image 15 which are useable to size and locate an image of the item 18 in generating the composite image 48. With reference to FIG. 2A, with an image of a person's face, a faceprint may be generated using known techniques which includes defined reference points of the person's face (e.g., spacing between eyes, spacing between mouth and eyes, etc.). A method of generating faceprints is disclosed in U.S. Pat. No. 7,564,994, which is incorporated by reference herein in its entirety. The faceprints provide relevant reference data points for the physical features data structures 44. In addition, with reference to FIG. 2B, with an image of a person's body or portion of a person's body (other than their face), a (virtual) model may be created, such as with the program "The DressingRoom," as well as web-tools and enterprise software tools, by Avametric., which provides reference points of the relevant body or body portions for the physical features data structures 44 (e.g., size of chest, size of waist, length of torso, etc.). The model may be two- or three-dimensional, depending on the application. The physical features data structures 44 may be electronically stored in memory, e.g., in the CPU 30, at least temporarily, and/or stored in an electronic storage associated with the CPU 30 for long-term storage. Retention of the physical features data structures 44 is required to permit creation of the composite image 48 as described below.

An image of the item 18 may be taken from electronic product database 46. The product database 46 contains product data structures 45 corresponding to each item intended for sampling. The product data structures 45 may each have details stored therein to graphically display the items for sampling to scale. The physical dimensioning of the items 18 are included in the product data structures 45. This allows for proper scaling relative to a target person's image particular for superimposition thereon. Any database arrangement (hierarchy, etc.) and database management system may be utilized with the database 46. An interface may be provided for merchants to upload to the product database 46 information relating to the product data structures 45 either directly and/or through the network 26 (e.g., through the CPU 30).

Details of the relevant data structure(s) (the physical features data structure(s) 44 and the product data structures 45) are extracted and used to render the item 18 as rendering 47. For example, a database management system associated with the database 46 may extract the product data structures 45 and the CPU 30 may extract the physical features data structures 44 from memory and/or electronic storage. The rendering 47 is generated to be superimposed on the provided image 15 of the target person to create the composite image 48. To properly superimpose, the sampling program of instructions 32 may cause the CPU 30 to utilize reference points from the physical features data structures 44 to orient, locate and size, as necessary, the rendering 47 relative to the image 15 using the scaling of the item 18 as provided in the product data structures 45. For example, the location of a person's nose from their faceprint may be extracted to identify where the bridge of a pair of eyeglasses should be located. The rendering 47, once processed relative to the reference points, is displayed superimposed on the image 15 on the sampling webpage 38 as the composite image 48 for viewing by the consumer 12.

The composite image 48 may be a static image or a dynamic image. For example, the composite image 48 may utilize a live, streaming video feed from the electronic device 14 as the image 15 for the composite image 48. With streaming video feed, movement of the person or part of the person shall result in corresponding movement of the item 18. In other words, the item 18 is registered to coincide with the reference points so as to move therewith.

Additional features may be incorporated into the system 10, such as facial or hand movement commands captured by the camera 40 acting as command functions.

The sampling webpage 38 may include a consumer engageable purchase feature 50 to allow the consumer 12 to purchase the selected item 18 (as rendered in the superimposed image 48). The purchase engageable feature 50 may be any graphical user interface feature, such as a clickable button, clickable menu item, etc. With the consumer 12 engaging the feature 50, a call, e.g., an API call, is generated which is transmitted across the network 26 to the interface 22 to request access to at least one of the digital wallets 24. The digital wallets 24 may be individually maintained or maintained as part of a network of wallets, including part of an electronic payment service such as MasterPass® brand electronic payment system. Account details of the digital wallets 24 may be stored in digital wallet database 52. The call may have embedded therein account-identifying details which are stored on the electronic device 14 or elsewhere. In addition, or alternatively, the interface 22 may respond with a request for account details (e.g., name associated with account, pin, password, etc.). With the account details, the interface 22 may make one or more relevant digital wallets 24 accessible to the consumer 12 to allow for purchase of the item 18. The database 52 may have stored therein details relating to the digital wallets 24, including preferences of the consumer 12 for shipping, payment, notifications, etc. Other engageable features may be provided on the sampling webpage 38 which allow for adding the item 18 to an electronic shopping cart or basket (to allow for further shopping and later checkout), and a "continue shopping" option which allows for the consumer 12 to leave the sampling webpage 38 and return to the merchant website 20 without purchase of the item 18.

One or more caching CPU's 54 may be utilized operatively connected to the CPU 30, directly or through the network 26, to conduct various portions of the processing described herein relative to the CPU 30. For example, the caching CPU 54 may be provided to interact with the database 46 in extracting the product data structures 45. In addition, or alternatively, the CPU 54 may be utilized to orient, locate and/or size the rendering 47 relative to reference points of the product date structures 45 in preparing the rendering 47 for superimposition on the image 15.

Figure 3:
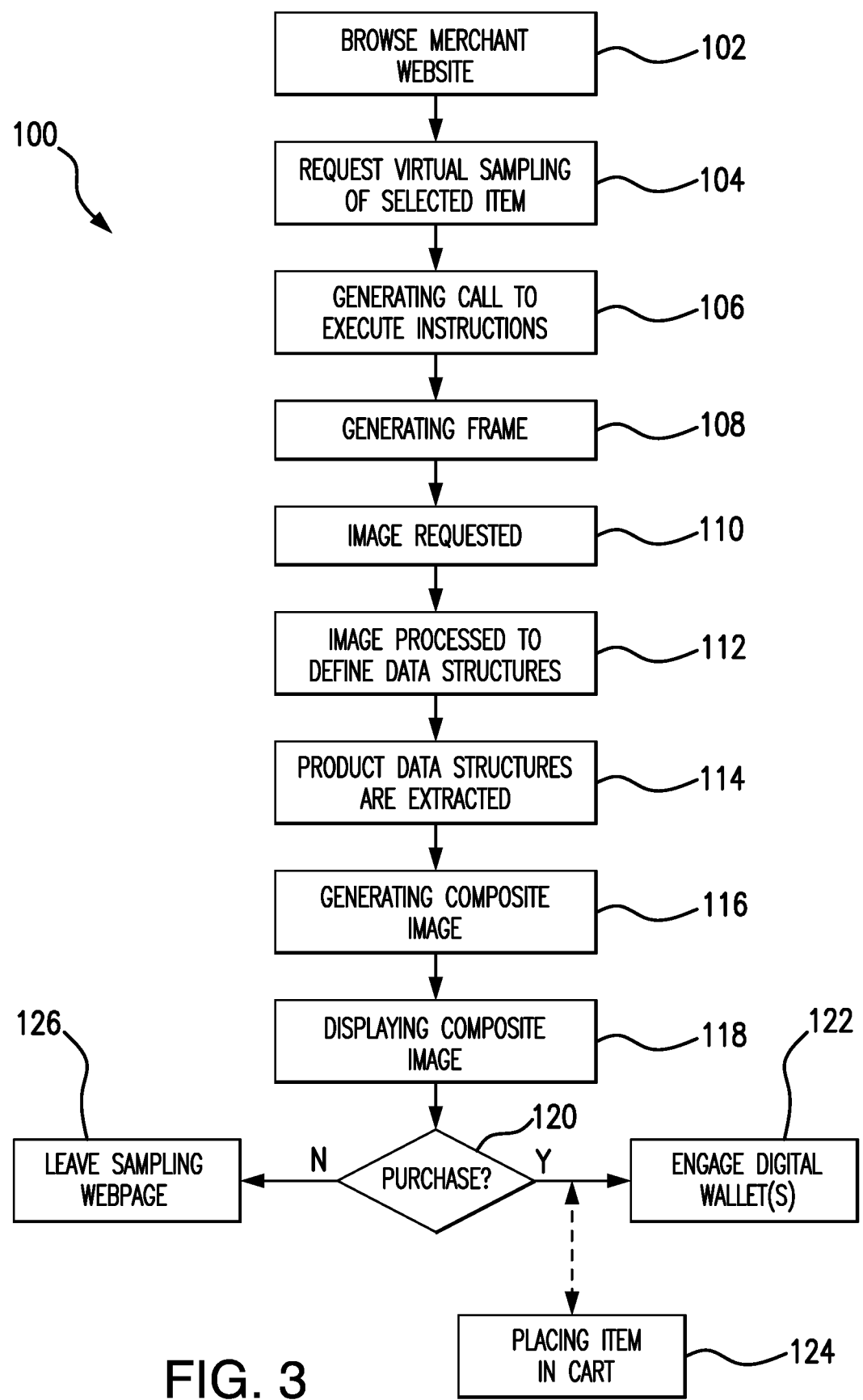

FIG. 3 is a flowchart representing a method 100 in accordance with the subject invention. In step 102, the consumer 12, using the browser 16 on the electronic device 14, visits the merchant's website 20 to browse items for sale. The consumer 12, in step 104, requests virtual sampling of a particular item 18 by engaging the consumer engageable feature 28. As a result, in step 106, a call is generated to the CPU 30 to request execution of the sampling program of instructions 32. With execution of the sampling program of instructions 32, in step 108, the frame 36 is generated by the browser 16 separate from the merchant's website 20. In step 110, the displayable arrangement 42 is generated by the browser 16 to request the image 15 to be provided.

In step 112, the image 15 is received and processed to define the physical features data structures 44. The product data structures 45 are extracted for the item 18 (step 114) with the composite image 48 being generated with superimposition of the rendering 47 on the image 15 (step 116) and display thereof on the sampling webpage 38 (step 118). The consumer 12 decides whether to purchase the item 18 (step 120). If there is interest, the consumer 12 may engage the feature 50 on the sampling webpage 38 to use one or more of the digital wallets 24 in purchasing the item 18 (step 122). Alternatively, the consumer 12 may place the item 18 into electronic cart or basket for later purchase (step 124). The consumer 12 may choose to not purchase the item 18 and leave the sampling webpage 38, e.g., to continue on-line shopping (step 126). As will be appreciated by those skilled in the art, steps of the method 100 may be conducted in various sequences consistent with the subject invention, including have some steps conducted partly or wholly simultaneously.

As used herein, the term "memory" is intended to include all currently known or hereafter developed types of permanent or temporary storage devices or components in a computing device. Exemplary memory types include, by way of illustration and not limitation, Random Access Memory (RAM)—further including Dynamic RAM (DRAM), Static RAM (SRAM), and Direct Rambus DRAM (DRDRAM), Read Only Memory (ROM)—further including Programmable ROM (PROM), erasable PROM (EPROM), and Electrically EPROM (EEPROM), cache memory, hard drives and flash memory. As used herein, the term "storage" is intended to include all currently known or hereafter developed types of permanent or temporary storage devices or components associated with a computing device. Exemplary storage types include, by way of illustration and not limitation, hard drives, external hard drives, solid state drives, tape drives, optical drives, flash memory, RAID storage, and USB storage. The terms "memory" and "storage" may be used interchangeably herein.

The program of instructions 32, and any other program discussed herein configured to cause a processor to execute certain steps or processes, may be stored on a non-transitory computer-readable medium. As used herein, the term "computer-readable medium" means and includes, but is not limited to, solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives that is considered a distribution medium equivalent to a tangible storage medium. Accordingly, the definition of "computer-readable medium" is considered to include anyone or more of a tangible computer-readable medium or a tangible distribution medium, as listed herein and including art-recognized equivalents and successor media, in which the software implementations herein are stored. The components of the system 10 may be considered to have or be associated with computer-readable medium, including, but not limited to, the electronic device 14, the CPU 30, the caching CPUs 54, the digital wallet interface 22, and the merchant server 21.

What is claimed is:

1. A system for enabling a consumer to virtually sample and purchase an item from a merchant, the consumer having an electronic device with a browser capable of navigating to a website of the merchant at which the consumer can select one or more items for purchase, the system comprising:

a computing processing unit having a processor and non-transitory memory, the computing processing unit being connectable to the electronic device via a network;

a sampling program of instructions stored in the memory; and, an interface for interfacing with a plurality of stored digital wallets to make accessible at least one digital wallet to the consumer, wherein, the sampling program of instructions, when executed in response to a call from the merchant website across the network, prompted by the consumer engaging a graphical user interface feature on a webpage of the website of the merchant, causes:

a frame to be generated on the electronic device by a browser separate from the merchant web site, the frame containing a sampling webpage;

transmission of a request to the electronic device for an image of a person or part of a person intended for use in virtually sampling an item found on the merchant website;

the image, upon receipt from the electronic device, to be processed to create physical features data structures corresponding to physical features of the person or part of the person;

item data structures to be extracted from a database, the item data structures providing details to allow the item to be varied in scale for graphical display;

the item to be scaled, utilizing the item data structures, based on the physical features data structures;

an image of the scaled item to be superimposed on the image of the person or part of the person utilizing the physical features data structures as reference points to create a composite image; and the composite image to be transmitted to the electronic device for display on the sampling webpage, wherein, a purchase graphical user interface element is located on the sampling webpage which when engaged causes the interface to make accessible at least one of the digital wallets to the consumer to allow for purchase of the item by the consumer, and wherein an interface is provided to allow the merchant to upload details related to the one or more items for storage in the item data structures.

2. A system as in claim 1, wherein the electronic device is selected from the group consisting of a smartphone, web-enabled device, computer, laptop, pad, and notebook.

3. A system as in claim 1, wherein the call from the merchant website is an API call.

4. A system as in claim 1, wherein the sampling webpage is located at a location specified by the sampling program of instructions.

5. A system as in claim 1, wherein the transmission of the request to the electronic device for the image causes a displayable arrangement to be generated on the electronic device.

6. A system as in claim 5, wherein the displayable arrangement is selected from the group consisting of an interstitial page, pop-up window, and dialog box.

7. A system as in claim 1, wherein the reference points are based on a faceprint of the person.

8. A system as in claim 1, wherein the reference points are based on a model of the person or part of the person.

9. A method for enabling a consumer to virtually sample and purchase an item from a merchant, the consumer having an electronic device with a browser capable of navigating to a website of the merchant at which the consumer can select one or more items for purchase, the method being conducted by a computing processing unit which is connectable to the electronic device via a network, the method comprising:

receiving a call from the merchant web site across the network, prompted by the consumer engaging a graphical user interface feature on a webpage of the website of the merchant;

generating a frame on the electronic device using the browser separate from the merchant web site, the frame containing a sampling webpage;

transmitting a request to the electronic device for an image of a person or part of a person intended for use in virtually sampling an item found on the merchant web site;

receiving the image of a person or part of a person;

processing the image of a person or part of a person to create physical features data structures corresponding to physical features of the person or part of the person;

extracting item data structures from a database, the item data structures providing details to allow the item to be varied in scale for graphical display;

providing an interface to allow the merchant to upload details related to the one or more items for storage in the item data structures;

scaling the item, utilizing the item data structures, based on the physical features data structures;

superimposing an image of the scaled item on the image of a person or part of a person utilizing the physical features data structures as reference points to create a composite image;

transmitting the composite image to the electronic device for display on the sampling webpage; and, providing a purchase graphical user interface element on the sampling webpage which when engaged causes a call to be generated requesting access to at least one digital wallet to allow for purchase of the item by the consumer.

10. A method as in claim 9, wherein the electronic device is selected from the group consisting of a smartphone, web-enabled device, computer, laptop, pad, and notebook.

11. A method as in claim 9, wherein the transmitting the request to the electronic device for the image causes a displayable arrangement to be generated on the electronic device.

12. A method as in claim 11, wherein the displayable arrangement is selected from the group consisting of an interstitial page, pop-up window, and dialog box.

13. A method as in claim 9, wherein the reference points are based on a faceprint of the person.

14. A method as in claim 9, wherein the reference points are based on a model of the person or part of the person.

* * * * *